Sept. 25, 1962 F. M. DEMER 3,055,583

PERFORATED RECORD READER

Filed Feb. 7, 1961 3 Sheets-Sheet 1

INVENTOR.
FREDERICK M. DEMER
BY Ronald J. Kransdorf
AGENT

Sept. 25, 1962 F. M. DEMER 3,055,583

PERFORATED RECORD READER

Filed Feb. 7, 1961 3 Sheets-Sheet 2

Sept. 25, 1962

F. M. DEMER 3,055,583

PERFORATED RECORD READER

Filed Feb. 7, 1961

3 Sheets-Sheet 3

3,055,583

PERFORATED RECORD READER

Frederick M. Demer, Johnson City, N.Y., assignor to International Business Machines Corporation, New York, N.Y., a corporation of New York Filed Feb. 7, 1961, Ser. No. 87,607
2 Claims. (Cl. 235—61.11)

This invention relates to record reading devices and more particularly to a rotary photoelectric device for reading a record bearing coded perforations.

Information utilized in modern electronic data processing machines may be received from several input sources among which are devices for reading perforated records such as punched tape. In general, such devices have relatively low operating speeds compared with the utilization rate of an electronic data processing machine, such as a digital computer. As a result, when a perforated record tape reader is used as a source of input information to a digital computer, a problem arises as to how to synchronize the transmission of data from the reader to the computer. One prior art solution to this problem is to provide a buffer storage unit into which data from the reader is fed and in which this data is stored prior to use by the computer. In this way, the low operating speed of a tape reading device may be compensated for; however, the result is an indirect means of transmitting data read from perforated record tape to a high speed data processing unit.

It is therefore an object of this invention to provide an improved high-speed perforated record reading device.

A more specific object of this invention is to provide a high speed perforated record reading device which is capable of transmitting data read from a section of the perforated record directly to a high speed data processing unit whereby the need for buffer storage is eliminated.

In accordance with these objects, the preferred embodiment of the invention utilizes as an essential element a cylinder which is adapted to be rotated at high speed. Successive sections of a flexible perforated record such as a punched tape are stationarily positioned about the periphery of the cylinder, some slack being left in the tape so as to provide an air bearing between the tape and the rotating cylinder. A row of photoelectric devices are recessed in the cylinder parallel with its rotary axis and are adapted to sense light spots, generated by light from a source circumscribing the cylinder, which pass through the coded perforations in the tape. The outputs from the photoelectric devices are detected and gated through to a utilization device.

The utilization device in the preferred embodiment controls the scanning and positioning mechanisms, and by causing the cylinder to be rotated at a velocity such that the frequency at which the photoelectric elements scan the coded tape perforations is equal to the data demand frequency of the utilization device, the need for a buffer storage unit is eliminated.

The foregoing and other objects, features and advantages of the invention will be apparent from the following more particular description of a preferred embodiment of the invention, as illustrated in the accompanying drawings.

Figure 1:
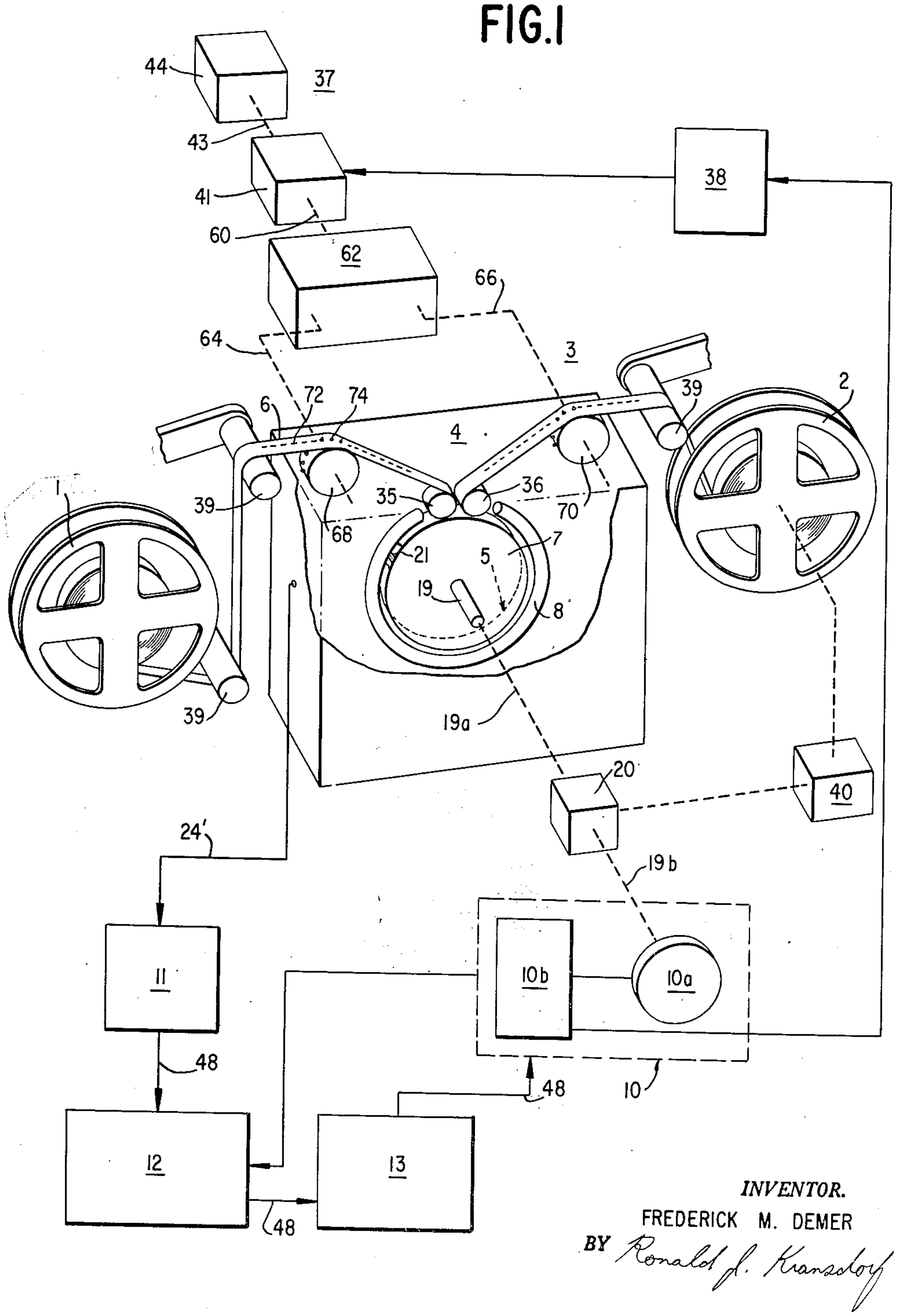
FIG. 1 is a semi-block diagram of a system embodying the invention.

A general understanding of the present invention may be obtained by observing the diagram of FIG. 1. For the sake of illustration, the following description will be concerned solely with a perforated tape reader, but it is to be understood that any other suitable flexible perforated record might be used.

Interposed between a supply reel 1 and a take-up reel 2 of a tape feed system 3 is a rotary photoelectric device 4. A section 5 of a record tape 6 is stationarily positioned about a rotatable cylinder 7 between the cylinder and a light source 8 circumscribed about the cylinder. Recessed in the cylinder are a plurality of light guides 21 (FIG. 2) terminating in photoelectric elements 9 adjacently disposed (FIG. 3) and aligned along the axis of rotation of the cylinder. Light from the light source passing through the coded perforations of the record tape (FIG. 3) and the light guides is sensed by the photoelectric elements causing a coded series of electric pulses to be generated as the cylinder is rotated. Pulses so generated by the photoelectric elements are transmitted to a utilization device 10, for example a digital computer comprising a rotating magnetic storage drum 10_a_ and circuitry 10_b_ through an amplifying and shaping circuit 11, a read control circuit 12, and a tape to computer code translator 13. The amplifying and shaping circuit and the tape to computer code translator may be of any suitable type; a suitable read control circuit will be described later.

Figure 3:
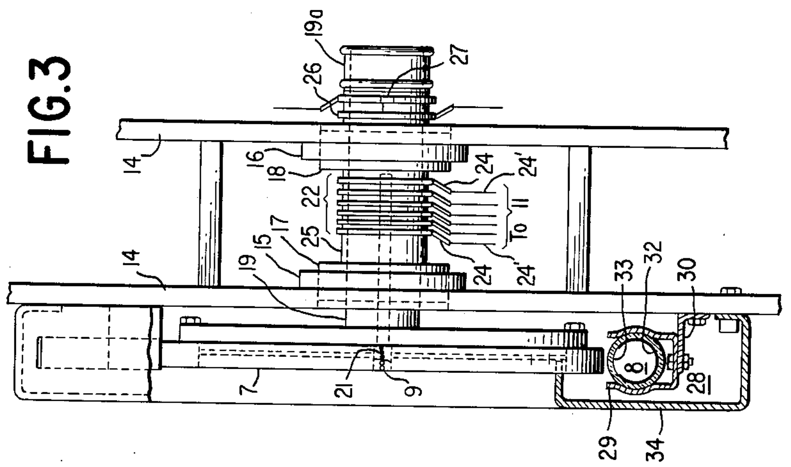
FIG. 3 is an enlarged side elevation view of the rotary photoelectric device shown in FIG. 2, with parts in section.
Figure 2:
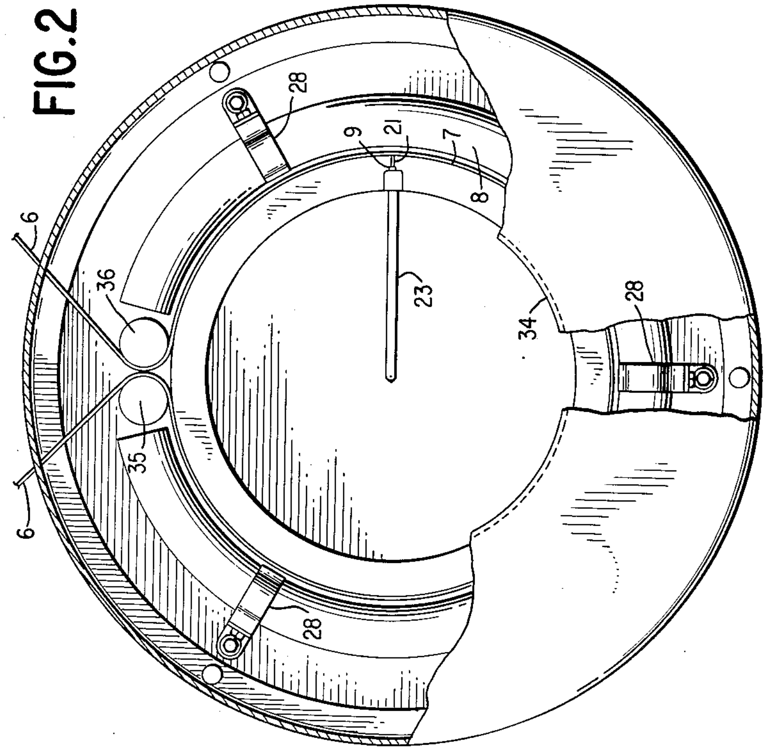
FIG. 2 is an enlarged front elevation view of a preferred embodiment of the rotary photoelectric device of the present invention.

Referring to FIGS. 2 and 3, it is seen that the rotary photoelectric device which is the preferred embodiment of this invention is constructed as follows: Mounted in frame 14 are two bearing support blocks 15 and 16, for supporting the bearings 17 and 18, which in turn rotatably support shaft 19. Rigidly secured to one end of shaft 19 is cylinder 7 which is the basic component of the rotary photoelectric device; and secured rigidly to the other end of shaft 19 is a drive shaft 19_a_ (which may be merely a continuation of shaft 19) for directly connecting shaft 19 to a source of continuous rotating power 20 (FIG. 1). Source 20 is also directly connected by shaft 19_b_ to rotate drum 10_a_.

Recessed in cylinder 7 are the photoelectric elements 9 which may, for example, be photodiodes. Photoelectric elements 9 are shown adjacently disposed and oriented along the rotational axis of cylinder 7. A light guide 21 (FIG. 2) extends from each photoelectric element to the lateral surface of cylinder 7. The light guide may be made of any suitable light conducting material having a black outside coating to improve the light to dark ratio at the elements 9 or may merely be holes bored in a suitable block of black material. The outputs of the photoelectric elements together with their common ground are electrically connected to slip rings 22 (FIG. 3) by cable 23. There is a related slip ring 22 for each photoelectric element 9. Cooperating with each slip ring is a related low noise level brush 24 which is connected by an associated line 24' to the amplifying and shaping circuit 11. The slip rings are insulated from shaft 19 by insulating material 25. Located on shaft 19 near the junction with drive shaft 19_a_ are read circuit slip ring 26 and read circuit commutator segment 27 which form part of a read control circuit hereinafter to be described.

The source of light 8 for energizing the photoelectric elements 9, FIG. 2 and FIG. 3, is seen to have a circular configuration. Clamps 28 are uniformly spaced along the light source to firmly hold it in position about cylinder 7. Details of the clamp are seen best in FIG. 3, wherein clamp 28 is seen to include a U-shaped clamping element 29 rigidly secured to a bracket 30 which in turn is secured to frame 14. The light source 8, shown in cross section in FIG. 3, is held in clamping element 29, and has a curved light shield 32 constructed of black material outside and reflective material inside, so that only a chord length 33, slightly wider than the tape to be read, of light source 8 is exposed. A light-and-dust guard 34, fastened to frame 14, covers most of the cylinder 7 and light source 8. Inlet and outlet tape guides 35 and 36 respectively are provided for guiding tape 6 as it is fed about the rotatable cylinder 7.

Record tape 6 is automatically fed from supply reel 1 to take-up reel 2 when tape drive mechanism 37 (FIG. 1) is operated by tape drive circuit 38 on signal from the utilization device. The tape drive mechanism includes an electrically operated tape drive clutch 41, for example a single tooth clutch, which on being energized is operable for one complete revolution. Drive clutch 41 is interposed between power shaft 43 connected to a source of continuous rotary power 44 and shaft 60 (FIG. 1) connected to step-up gear box 62. Tape drive capstans 68 and 70 are respectively connected to shafts 64 and 66 driven by gears (not shown) in gear box 62. The gear tooth ratio of the gears in box 62 is such that for each complete revolution of shaft 60, a number of revolutions roughly equal to the ratio of the diameter of cylinder 7 to that of drive capstans 68 and 70 will be imparted to shafts 64 and 66.

Tape 6 has sprocket holes 72 (FIG. 5) which are threaded on teeth 74 of capstans 68 and 70. Some slack is left in the tape section 5 between the two drive capstans so as to provide a cushion of air between the tape and the rotating cylinder 7. This air cushion prevents seizure of the tape by the rotating cylinder. If it were desired to prevent any contact between the tape and the cylinder, the tape could be passed over a transparent channel which would encircle but not touch the cylinder; or the tape could be fed into a vacuum column.

A slip clutch 40 is interposed between source of continuous rotary power 20 and take up reel 2. The slippage in clutch 40 is sufficient to prevent any rotation of reel 2 unless there is slack in the portion of the tape between it and capstan 70. A plurality of stationary capstans 39 are provided to guide tape 6.

Figure 4:
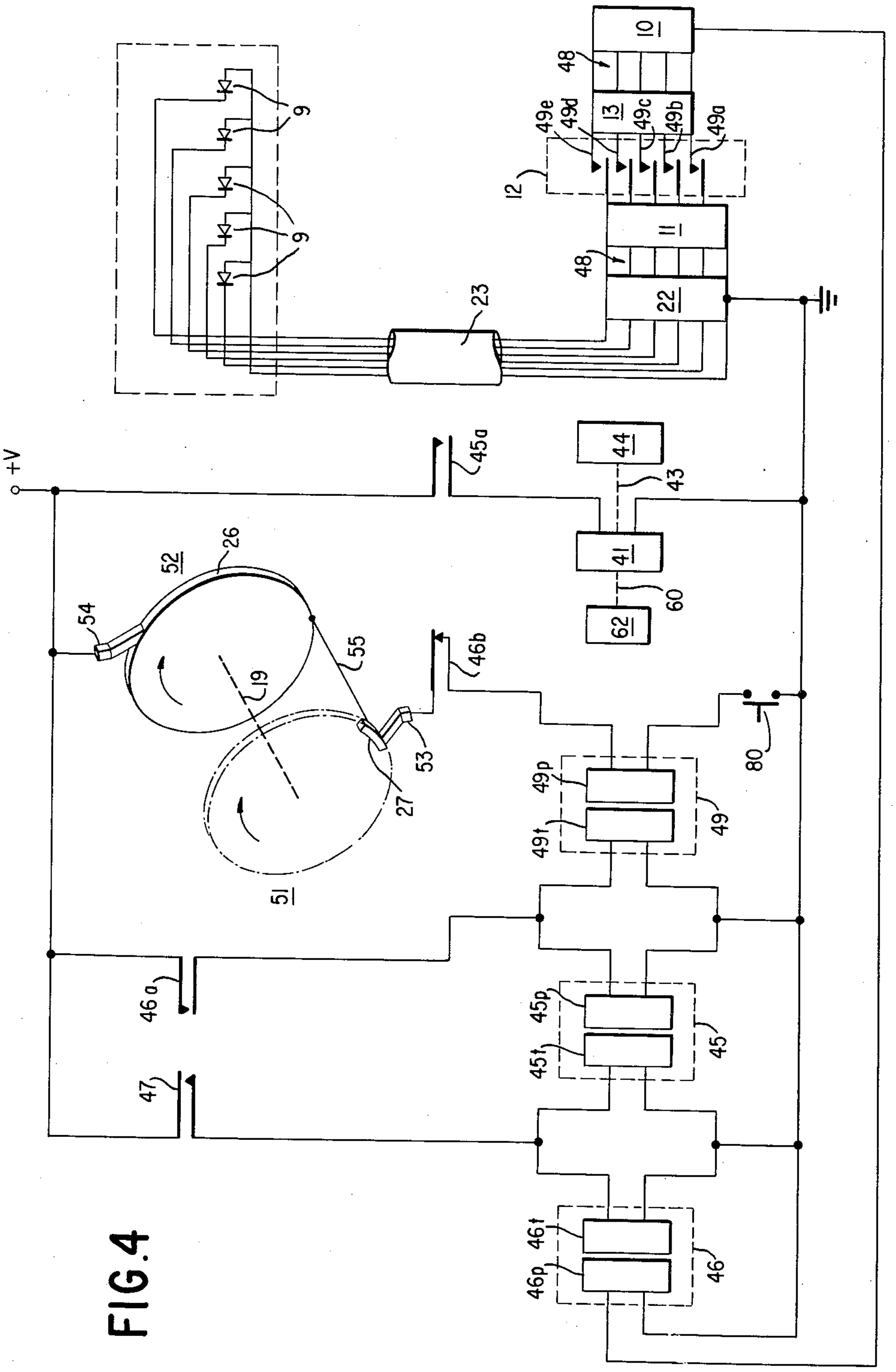
FIG. 4 is a schematic diagram of the control circuitry for the tape drive mechanism.

The control circuitry for the tape reader of this invention is shown in FIG. 4. Latch relays of a type having two coils, a pick coil and a trip coil, are used in this circuit. An example of such a relay is shown in Patent No. 2,510,604 issued to W. Pfaff et al. June 6, 1950. When the pick coil is energized, its armature is moved to an energized position, transferring the relay contacts, and is latched in this position by a flange on the trip coil's armature. Energy may therefore be removed from the pick coil and the contacts wil remain transferred until the trip coil is energized unlatching the pick coil's armature and allowing the relay to be reset.

Referring to FIG. 4 drive clutch 41 is provided with an operating circuit from plus voltage to ground including a normally open drive clutch contact point 45*a*, operated by drive clutch latch relay 45. Drive clutch relay 45 has a pick coil 45*p* and a trip coil 45*t*. Pick coil 45*p* is in a circuit including a normally open tape feed demand contact point 46*a* of tape feed demand latch relay 46. Latch relay 46 has a pick coil 46*p* controlled by utilization device 10 and a trip coil 46*t* in series with normally open one revolution contact 47 (the function of which will be described later).

On energization of demand relay 46, drive clutch relay 45 will be latched, energizing drive clutch 41 to drivingly connect power shaft 43 with shaft 60 for one complete revolution. During this revolution of shaft 60, shafts 64 and 66 (FIG. 1) will be advanced a sufficient number of revolutions to position a completely new section of tape 6 about cylinder 7. Consequently, to insure stopping of the tape feed for each new section of tape, a normally open one revolution contact 47 is provided in series with the drive clutch trip coil 45*t* and with demand relay trip coil 46*t*. This contact is adapted to be closed by clutch 41 just prior to the completion of one revolution thereof. Energization of trip coil 45*t* will cause drive clutch contact 45*a* to be opened de-energizing clutch 41 and allowing power shaft 43 to be disconnected from shaft 60, thereby stopping the advance of the record tape. Energization of demand relay trip coil 46*t* unlatches tape feed relay 46, thereby opening tape feed contact point 46*a* in series with the pick coil 45*p* of the relay 45 to further assure disability of clutch 41, and closing tape feed contact point 46*b* in the read control circuitry 12 to render it ready to begin a read cycle.

Associated with the photoelectric elements 9 of the tape reader and the utilization device is a read control circuit 12 (FIG. 1). As mentioned before, there is a slip ring 22 related to each of the photoelectric elements. The slip rings 22 are connected to the utilization device 10 by related lines 48 each of which includes one of the normally open read control contact points 49*a* through 49*e* (FIG. 4) of the read control circuit 12. A read control latch relay 49 operates to close the read control contact points when latched on energization of pick coil 49*p*. Pick coil 49*p* is connected in series with a start-read contact 80, a normally closed tape feed demand contact point 46*b*, a read commutator circuit 51 and a read slip ring circuit 52. Commutator circuit 51 includes segment 27 carried by shaft 19 and a brush 53 for contacting segment 27. Slip ring circuit 52 includes slip ring 26 carried by shaft 19 and a brush 54 for contacting ring 26. Brush 53 will contact segment 27 once each revolution of shaft 19 while brush 54 will be in continuous contact with ring 26 throughout revolutions of shaft 19. As a result, a circuit to pick coil 49*p* of read control relay 49 will be available only once during a revolution of shaft 19. Ring 26 is connected to segment 27 by line 55.

Figure 5:
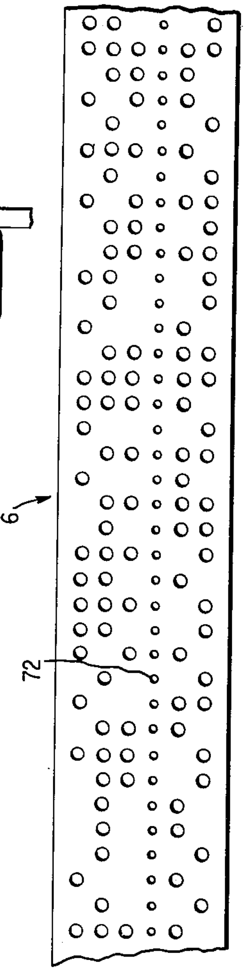
FIG. 5 is a section of a record tape such as might be used with the devices shown in FIGS. 1–3.

For illustrative purposes, the record tape shown in FIG. 5 is seen to bear a five bit code. Perforations according to the five bit code are oriented in channels running the length of the record tape and in character lines running transverse to the tape channels. A channel of sprocket holes 72 is also provided. A character is represented by perforations, in a single character line, disposed in a particular one or combination of the five channels. When reading a section of tape it is therefore necessary to provide five photoelectric elements 9 in the rotary photoelectric device, one element to read a perforation in each of the tape channels. Reading by the rotary photoelectric device in this instance will therefore be parallel by bit and serial by character. While a five bit code is herein represented, it is to be understood that any other suitable code may be used.

The device as so far described operates in the following manner:

Tape 6 is initially threaded, either manually or otherwise, from reel 1, over stationary capstans 39, drive capstan 68, cylinder 7, drive capstan 70, and stationary capstan 39 to reel 2. The first character to be scanned is positioned a predetermined distance below capstan 36 and sufficient slack is left in the tape section 5 between drive capstans 68 and 70 to prevent binding of the tape when the cylinder is rotated. Sprockets 74 of the drive capstans are then fitted in adjacent sprocket holes 72 of the tape.

If the source of rotary power 20 is not already on, it is turned on and sufficient time permitted for cylinder 7 to attain full speed. Since power source 20 also drives storage drum 10*a* of the utilization device, the rotation of these two elements is synchronized and, assuming that the number of characters-per-radian of the drum is equal to that of the tape positioned about the cylinder, the data sensed by photoelectric elements 9 may be transmitted directly to drum 10*a* without the need for any buffer storage unit.

Before the beginning of the first read cycle start-read contact 80 is closed. At this time all the circuit relays (FIG. 4) are unlatched; therefore, contacts 45*a*, 46*a*, 47, and 49*a* through 49*e* are all open while contact 46*b* is closed. Contacts 45*a* and 46*a* being open prevents any spurious advancing of the tape during a scan cycle.

At zero time in the scan cycle commutator brush 53 of the read commutator circuit 51 contacts commutator segment 27, completing a circuit from plus voltage, through slip ring brush 54, slip ring 26, line 55, commutator segment 27, commutator brush 53, closed tape feed contact point 46*b*, latch pick coil 49*a*, and closed start-read contact 80 to ground. This will energize the read relay to close contact points 49*a* through 49*e* of the read control circuit. A circuit now exists from photoelectric elements 9 of the rotary tape reader through cable 23, related slip rings 22 and brushes 24, amplifying and shaping circuitry 11, now closed read relay contact points 49*a* through 49*e* of read control circuit 12, and code translator 13, to utilization device 10. Therefore, as a section 5 of the record tape is scanned by the rotary tape reader during a read cycle, light from the light source 8, coming through coded perforations on the record tape will, as the rotary photoelectric device scans the tape, be conducted by the light guides 21 associated with the photoelectric elements 9 to impinge thereon. The corresponding series of coded electrical pulses generated by the photoelectric elements will be transmitted along cable 23 to the related slip rings 22, picked up there by the brushes 24 and fed through amplifying and shaping circuits 11, now closed contacts 49*a* through 49*e* of read control circuit 12, and code translator 13, to utilization device 10. These pulses would generally trigger a write circuit (not shown) of the utilization device to cause information to be stored on a memory unit, for example magnetic drum 10*a*. If section 5 of the record tape is to be read or scanned several times the conditions just described will exist and will continue to exist until a signal is generated by the utilization device to cause energization of latch pick coil 46*p* of tape feed relay 46.

Assume that a signal is generated by the utilization device to energize latch pick coil 46*p* of tape feed relay 46. This signal acts concurrently as both a "tape feed signal" and a "no-read signal." On energization of the tape feed relay 46, the tape feed relay contact point 46*a* is closed to complete a circuit from plus voltage through read relay trip coil 49*t*, thereby de-energizing the read relay 49 to open the contacts 49*a* through 49*e*. The energization of relay 46 also causes contact point 46*b* in the read circuit 12 to be opened to prevent read relay 49 from being relatched on the next cycle when brush 53 contacts commutator segment 27. As a result, the read circuitry is disabled.

Further, the closing of tape feed relay contact point 46*a* allows latch pick coil 45*p* of the clutch relay 45 associated with clutch 41 of the tape drive mechanism 37 to be energized. As a result, the clutch relay contact point 45*a* in the clutch circuit is closed, causing the clutch to be engaged for one revolution of shaft 43. The clutch will for this revolution, connect power shaft 43 to drive shaft 60 to advance the record tape bringing a second section of the record tape into the scanning position. The section of tape which was in the scanning position will appear as slack in the tape section between capstan 70 and reel 2. This slack will be taken up by the rotation of reel 2 caused by power source 20 acting through slip clutch 40.

Means associated with the clutch are provided to close the one revolution contact point 47 at the end of the clutch revolution. This completes a circuit from plus voltage through trip coil 45*t* to de-energize clutch relay 45. The clutch contact point 45*a* in series with clutch 41 is thereby opened interrupting the circuit to the clutch and rendering the clutch inoperative. Power shaft 43 of tape drive mechanism 37 will now be disconnected from shaft 60 and the advance of record tape 6 stopped. On closure of the one revolution contact 47, latch trip coil 46*t* of tape feed relay 46 is also energized thereby unlatching the tape feed relay. As a result, a new tape section has now been moved into the reading position previously occupied by tape section 5. It should be noted that a complete revolution of the single tooth clutch causes the drive capstans 68 and 70 to be rotated a number of times which is roughly proportional to the ratio between the diameters of the cylinder 7 and the capstans. As a result, gear box 62 combines with clutch 41 to perform a metering operation, bringing a completely new section of record tape into a reading position for each energization of tape feed relay 46. If it is desired that a tape section, as for example section 5, be read a second or third or any number of times, a suitable delay may be provided to delay the signal from utilization device 10 to the tape feed relay pick coil 46*p*.

One possible modification in the structure recited above would be to replace the cylinder 7 with a rotating arm having the light guides 21 and the photocells 9 mounted at its end. Numerous other modifications in structure would also be within the concept of the invention.

Therefore, while the invention has been particularly shown and described with reference to a preferred embodiment thereof, it will be understood by those skilled in the art that various changes in form and details may be made therein without departing from the spirit and scope of the invention.

I claim:

1. A photoelectric device for reading a record tape having uniformly distributed code bit positions selectively perforated to represent data, comprising in combination a rotating cylindrical member having a row of photoelectric elements imbedded therein and aligned parallel to the axis thereof; means for positioning successive sections of said tape about the periphery of said cylindrical member, a light source adapted to radiate the tape on the periphery of said cylindrical member; means for guiding the light passing through each coded perforation in said tape to a related one of said photoelectric elements as said elements scan the tape, whereby the output from said photoelectric elements will be a series of coded pulses representing the data originally represented on said tape; and means for detecting said series of coded pulses.

2. In combination with a photoelectric device of the type described in claim 1, a high speed utilization device adapted to control the operation of said photoelectric device, the cylindrical member being rotated at a velocity such that the frequency at which the photoelectric elements scan the coded tape perforations is equal to the data demand frequency of the utilization device, and means for transmitting the coded output pulses from said photoelectric elements directly to said utilization device.

References Cited in the file of this patent

UNITED STATES PATENTS

| | | |
|---|---|---|
| 2,727,091 | Zenner | Dec. 13, 1955 |
| 2,938,666 | Rand | May 31, 1960 |